(12) United States Patent
Jiang et al.

(10) Patent No.: US 11,973,588 B2
(45) Date of Patent: Apr. 30, 2024

(54) RATE MATCHING RESOURCE MAPPING IN WIRELESS COMMUNICATIONS

(71) Applicant: ZTE Corporation, Guangdong (CN)

(72) Inventors: Chuangxin Jiang, Guangdong (CN); Zhaohua Lu, Guangdong (CN); Yu Ngok Li, Guangdong (CN); Xinquan Ye, Guangdong (CN); Huahua Xiao, Guangdong (CN); Wenjun Yan, Guangdong (CN); Zhen He, Guangdong (CN); Shujuan Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 407 days.

(21) Appl. No.: 17/368,248

(22) Filed: Jul. 6, 2021

(65) Prior Publication Data
US 2021/0344442 A1    Nov. 4, 2021

Related U.S. Application Data

(63) Continuation of application No. PCT/CN2019/070411, filed on Jan. 4, 2019.

(51) Int. Cl.
*H04L 1/00* (2006.01)
*H04L 5/00* (2006.01)

(52) U.S. Cl.
CPC ............ *H04L 1/0013* (2013.01); *H04L 1/001* (2013.01); *H04L 5/0048* (2013.01)

(58) Field of Classification Search
CPC ..... H04L 1/0013; H04L 1/001; H04L 5/0048; H04L 5/0092; H04L 5/0035; H04L 5/005

(Continued)

(56) References Cited

U.S. PATENT DOCUMENTS

2015/0223254 A1    8/2015  Guo et al.
2015/0257139 A1    9/2015  Chen et al.
(Continued)

FOREIGN PATENT DOCUMENTS

CN    103634074 A    3/2014
CN    104756435 A    7/2015
(Continued)

OTHER PUBLICATIONS

CNIPA, First Office Action for Chinese Application No. 2019800876948, dated May 7, 2022, 28 pages with unofficial translation.

(Continued)

*Primary Examiner* — Don N Vo
(74) *Attorney, Agent, or Firm* — Perkins Coie LLP

(57) ABSTRACT

A method of wireless communication includes grouping, by a network device, rate matching resources into a plurality of first groups for communication with a wireless terminal and transmitting a channel control indicator identifying at least a first group from the plurality of first groups of rate matching resources. In various embodiments, the rate matching resources include one or more of a rate matching pattern comprising multiple time-frequency transmission resources, a periodic zero power channel state information reference signal (ZP CSI-RS) resource set, an aperiodic ZP CSI-RS resource set, a semi-persistent ZP CSI-RS resource set, a long-term evolution cell specific reference signal (LTE CRS) resource, or a rate matching pattern group.

19 Claims, 8 Drawing Sheets

700

| Grouping rate matching resources into a plurality of first groups for communication with a wireless terminal | ~ 702 |

| transmitting a channel control indicator identifying at least a first group from the plurality of first groups of rate matching resources | ~ 704 |

(58) Field of Classification Search
USPC .......................................................... 455/450
See application file for complete search history.

(56) References Cited

U.S. PATENT DOCUMENTS

| | | | |
|---|---|---|---|
| 2018/0343653 | A1 | 11/2018 | Guo |
| 2019/0116009 | A1* | 4/2019 | Yum ................. H04W 72/0446 |
| 2019/0158205 | A1* | 5/2019 | Sheng ................... H04L 5/0048 |
| 2019/0190673 | A1* | 6/2019 | Kwak ............... H04W 72/0446 |
| 2019/0215096 | A1* | 7/2019 | Kim ....................... H04L 1/0025 |
| 2019/0379494 | A1* | 12/2019 | Kakishima ............ H04L 5/0053 |
| 2021/0168030 | A1 | 6/2021 | Li |
| 2022/0376867 | A1 | 11/2022 | Gao et al. |
| 2023/0199790 | A1 | 6/2023 | Zhang et al. |

FOREIGN PATENT DOCUMENTS

| | | |
|---|---|---|
| CN | 105007600 A | 10/2015 |
| CN | 108092754 A | 5/2018 |
| CN | 108199819 A | 6/2018 |
| CN | 109076560 A | 12/2018 |
| WO | 2018063072 A1 | 4/2018 |
| WO | 2018156696 A1 | 8/2018 |
| WO | 2018/226039 A2 | 12/2018 |
| WO | 2018232090 A1 | 12/2018 |

OTHER PUBLICATIONS

ZTE, "Enhancements on multi-TRP/Panel transmission," 3GPP TSG RAN WG1 #95, Spokane, USA, R1-1812256, Nov. 12-16, 2018.
EPO, Intention to grant for European Application No. 19849610.1, dated Jun. 7, 2023, 9 pages.
Ericsson, "On beam indication, measurement, and reporting," 3GPP TSG-RAN WG1 #90bis, Prague, Czech Republic, R1-1718433, 9 pages, Oct. 13, 2017.
International Search Report and Written Opinion dated Sep. 26, 2019 for International Application No. PCT/CN2019/070411, filed on Jan. 4, 2019 (6 pages).
Mediatek Inc., "Remaining details of control signalling for DL CoMP," 3GPP TSG RAN WG1 Meeting #70bis, R1-124277, San Diego, USA, Oct. 8-12, 2012, 6 pages.
European Search Report for EP Patent Application No. 19849610.1, dated Dec. 16, 2021, 10 pages.
Co-Pending CN Application No. 201980087694.8, Chinese Notification to Complete Formalities of Registration dated Nov. 29, 2022, 6 pages with unofficial translation.
NEC Group, "ZP-CSI-RS Configuration for IMRs and PDSCH RE matching," 3GPP TSG RAN WG1 #71, New Orleans, US, R1-124849, Nov. 12-16, 2012. 4 pages.

\* cited by examiner

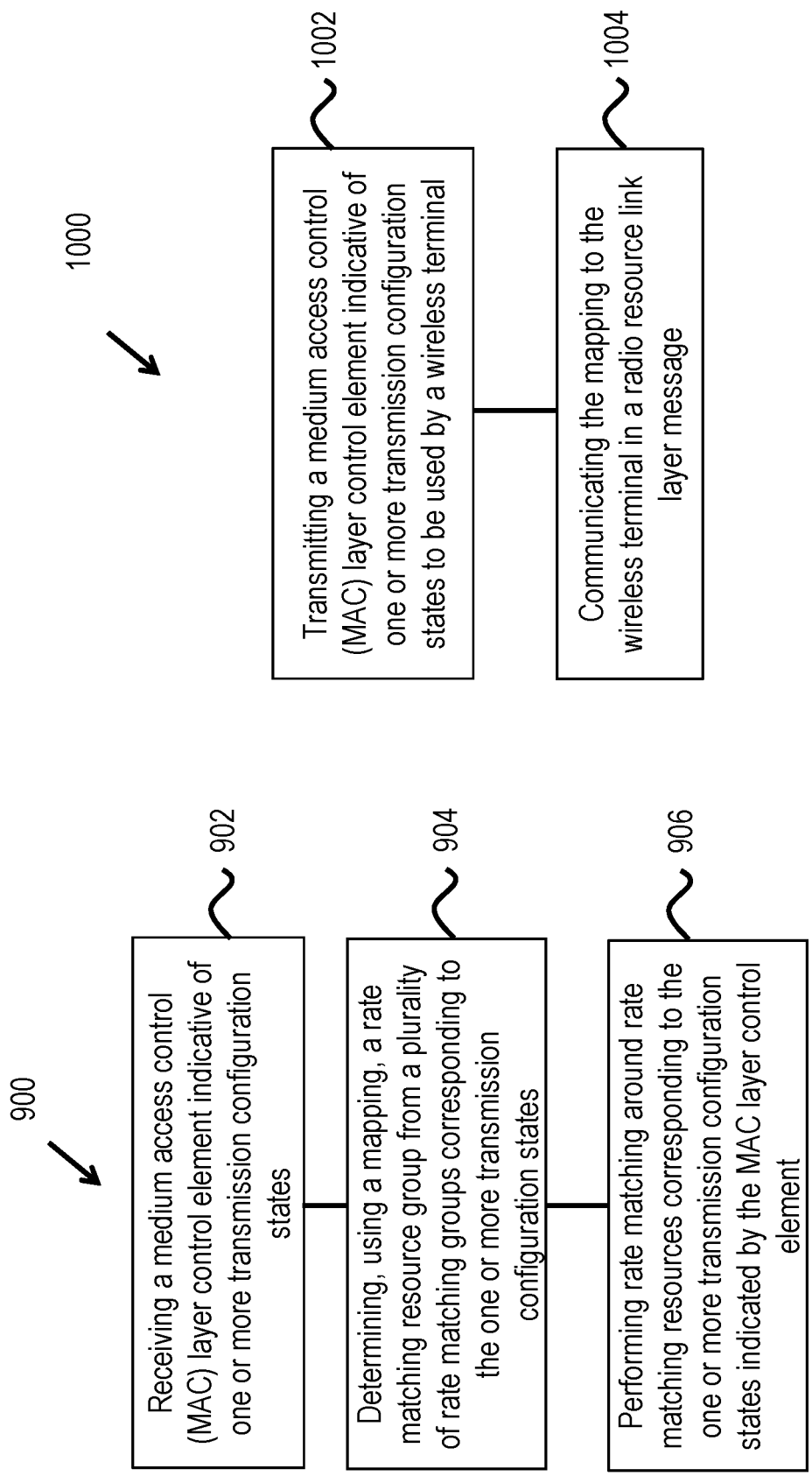

RATE MATCHING RESOURCE MAPPING IN WIRELESS COMMUNICATIONS

CROSS-REFERENCE TO RELATED APPLICATIONS

This application is a continuation of International Patent Application No. PCT/CN2019/070411, filed on Jan. 4, 2019, the contents of which are incorporated herein by reference in their entirety.

TECHNICAL FIELD

The present document relates to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved bandwidth performance are being discussed.

SUMMARY

The present document describes techniques that can be used in various embodiments for signaling of rate matching resources in a wireless system deployment in which multiple transmission reception points provide communication connectivity to mobile terminals.

In one example aspect, a method of wireless communication is disclosed. The method includes grouping, by a network device, rate matching resources into a plurality of first groups for communication with a wireless terminal and transmitting a channel control indicator identifying at least a first group from the plurality of first groups of rate matching resources.

In another example aspect, another method of wireless communication is disclosed. The method includes receiving, at a wireless terminal, a channel control indicator identifying at least a first group of rate matching resources from a plurality of rate matching resources and receiving a transmission from a network device by rate matching around some rate matching resources of the first group of rate matching resources indicated by the channel control indicator.

In yet another example aspect, another method of wireless communication is disclosed. The method includes receiving, by a wireless terminal, a medium access control (MAC) layer control element indicative of one or more transmission configuration states to be used by the wireless terminal, determining, using a mapping, a rate matching resource group from a plurality of rate matching resource groups corresponding to the one or more transmission configuration states and performing rate matching around rate matching resources corresponding to the one or more transmission configuration states indicated by the MAC control element.

In yet another example aspect, another method of wireless communication is disclosed. The method includes transmitting, by a network device, a MAC layer control element indicative of one or more transmission configuration states to be used by a wireless terminal, wherein a mapping defines a correspondence between a rate matching resource from a plurality of rate matching resource groups, wherein the rate matching resources are rate matched around for shared data channel transmissions from the network device to the wireless terminal, and communicating the mapping to the wireless terminal in a radio resource link layer message.

In yet another aspect, one or more of the above-described methods may be implemented by a wireless communications apparatus that includes a processor.

In yet another aspect, the above-described methods may be embodied as processor-executable code and stored on a computer readable medium.

These, and other, features are described in the present document.

BRIEF DESCRIPTION OF THE DRAWINGS

FIG. 9 shows a flowchart for another example method of wireless communication.

FIG. 10 shows a flowchart for another example method of wireless communication.

DETAILED DESCRIPTION

Figure 1:
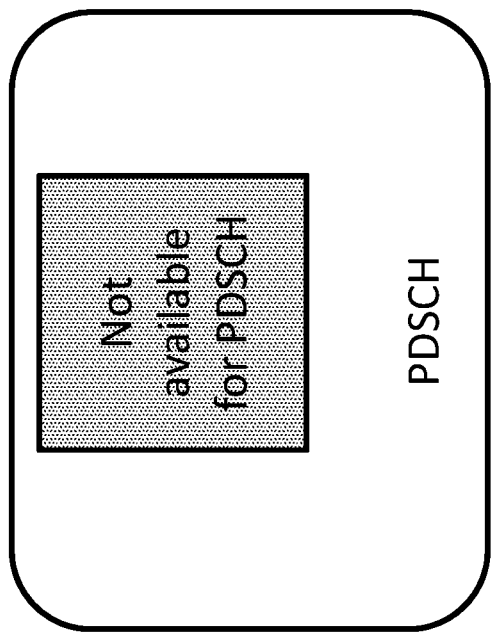
FIG. 1 shows an example of a single point transmission configuration.
Figure 1:
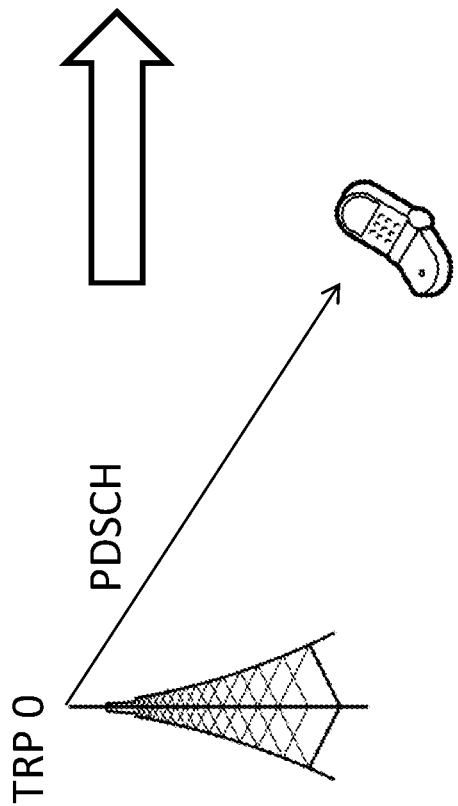

Section headings are used in the present document only for ease of understanding and do not limit scope of the embodiments described in each section only to that section. Furthermore, while 5G terminology is used for easy understanding, the scope of the disclosed technology is not limited to 5G networks only.

Brief Discussion

Traditional wireless systems provided for wireless network connectivity between mobile terminals and network-side devices between a single transmission point on the network side (e.g., a base station, eNodeB or gNB) and the mobile terminal. In such cases, for transmissions from the network device to the mobile terminals, sometimes called downlink transmissions, various standards define arrangement of different time-frequency resources into multiple channels having different purpose. For example, certain time/frequency resources may be used for transmission of physical downlink shared channel (PDSCH) messages to mobile terminals.

However, in practice, as further explained below, some time-frequency resources may be excluded from use for PDSCH transmission to a particular mobile terminal. Therefore, when receiving such transmissions, the mobile terminal is expected to perform rate matching around the excluded resources, or the rate matching resources.

Currently, there is work undertaken by the Third Generation Partnership Project (3GPP) to define protocols and transmission/reception rules for next generation of wireless networks. In the current standard of the NR (new radio) specification, called Release-15 (or Rel-15 or R15), networks are allowed to provide transmissions to mobile terminals using multiple transmission reception points (TRPs) that work in coordination with each other. However, in Release-15, many features of multi-TRP (transmission receive point) joint transmission are not fully discussed due to time constraints. Therefore, the current NR version does not support data transmission to the same user by multiple TRPs. That is, in the current version of the standard, only single TRP transmission to a mobile terminal or user equipment (UE) is supported.

For multi-TRP transmission, rate matching resources may in general be different than single TRP transmission. However, in the 5G wireless protocol, the current version of the standard, Rel-15, does not support rate matching resource indication for multi-TRP transmissions.

During operation in a single TRP transmission mode, the base station indicates to the UE some resources for rate matching of data transmission through high layer signaling configuration or dynamic signaling. These resources are often used for important signals that the base station uses to transmit to other UEs. Since the important signals sent to other UEs and the downlink data of the UE are sent by the same base station, which may cause serious interference with each other, the resources configured or indicated cannot be used for downlink data transmission of the UE, that is, the UE is receiving data. Rate matching is required on these resources.

One problem with the current framework is that it is not known how to signal rate matching resources for multiple TRPs using the currently available formats of channel indicator messages such as Downlink Control Information (DCI) formats specified by the 3GPP standard. Furthermore, current techniques do not take into account quasi co-location (QCL) operation and provide for corresponding signaling of rate matching resources.

The various techniques described in the present document using various embodiment examples may be used in wireless implementations to overcome these shortcomings of current technology, and others.

Example Embodiment 1

The design of the NR release 15 is a single point (single TRP) transmission. As shown in FIG. 1, TRP0 is the serving base station of the UE, and notifies the UE of some rate matching resources, that is, these resources cannot be used for PDSCH transmission (not available for PDSCH).

Generally, the rate matching resources may include a serving cell or a rate matching resource configured under the Component Carrier (CC), such as a rate matching pattern list (rateMatchPatternToAddModList or rateMatchPatternToReleaseList) and an LTE CRS (Cell-specific Reference Signal) resource (lte-CRS-ToMatchAround). Semi-statically, these resources are not available for PDSCH transmission.

The rate matching resources may also include a rate matching resource configured under BWP (Band Width Part), such as a rate matching pattern list (rateMatchPatternToAddModList or rateMatchPatternToReleaseList), a periodic zero power CSI-RS (Channel State Information Reference Signal) resource set list (p-ZP-CSI-RS-ResourceSet), Semi-persistent zero-power CSI-RS resource set list (sp-ZP-CSI-RS-ResourceSetsToAddModList). Semi-statically, those resources (except some rate matching patterns included in rate matching pattern groups) are not available for PDSCH transmission scheduled by DCI format 1_1.

In addition, current $N_{oh}^{PRB}$ is the overhead configured by higher layer parameter xOverhead in PDSCH-ServingCell-Config, this parameter can also be one kind of rate matching parameter.

In addition, the rate matching resource configured in the BWP further includes a rate matching pattern group 1 (rateMatchPatternGroup1), a rate matching pattern group 2 (rateMatchPatternGroup2), and an aperiodic zero power CSI-RS resource set list (aperiodic-ZP-CSI-RS-ResourceSetsToAddModList). The 1 or 2 bit Rate matching indicator in the DCI is used to indicate whether the PDSCH scheduled by the DCI is transmitted on the resources included in the rate matching pattern group 1 and the rate matching pattern group 2. At the same time, the 1st or 2nd bit ZP CSI-RS trigger in the DCI is used to indicate which ZP CSI-RS resource set in the aperiodic zero-power CSI-RS resource set list is used for rate matching of the PDSCH.

As can be seen from the above, these rate matching resources can be divided into semi-static and dynamic, and dynamic rate matching resources require the base station to perform selection indication in the DCI. Therefore, not all dynamic rate matching resources must be unavailable for PDSCH transmission. It can only be unavailable if it is indicated in the DCI.

In a single-point transmission, as shown in FIG. 1, if the TRP0 uses the LTE frequency band, that is, the TRP0 needs to send the CRS of the LTE, the LTE CRS resource included in the rate matching is used to send the CRS to the LTE user. That is, it cannot be used for PDSCH transmission of NR. Similarly, TRP0 can transmit other important signals on the configured rate matching resources instead of the UE's data. This is done to avoid other serious signals transmitted by TRP0 and the PDSCH of the UE with very serious interference, resulting in system performance degradation.

Figure 2:
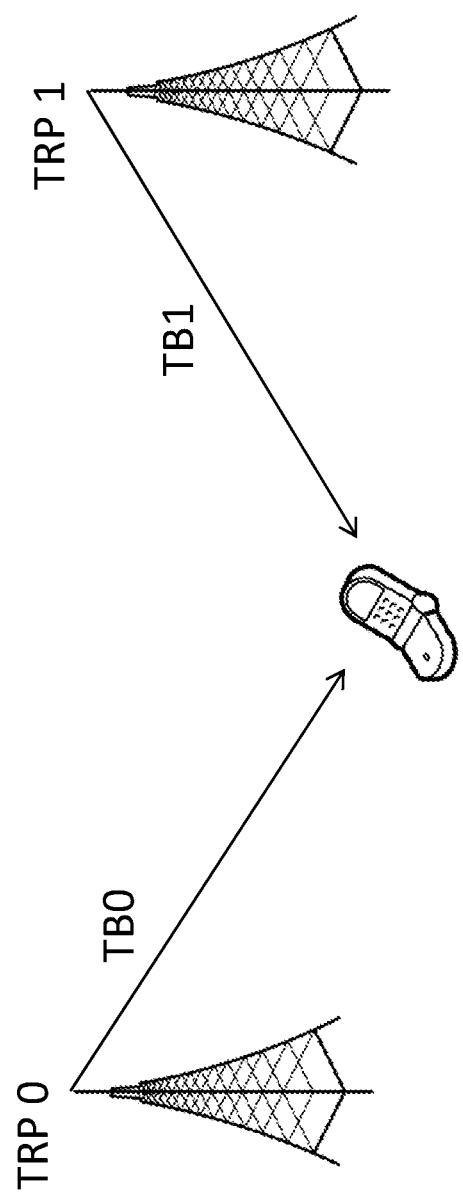
FIG. 2 shows an example of a multi-transmission reception point (TRP) configuration.

However, the design of NR release 15 does not consider the multi-TRP (multi-point transmission) transmission scheme, that is, multiple TRPs transmit data to the same user. As shown in FIG. 2, both TRPs (TRP0 and TRP1) transmit data to the same user. The transmissions from the TRPs are shown as transmission blocks TB0 and TB1, respectively.

In the scenario where there is a backhaul of sufficiently low latency and high bandwidth between TRP0 and TRP1, the primary serving base station of the mobile terminal or UE (assumed to be TRP0) can send a physical downlink control channel (PDCCH) transmission to schedule multiple data streams, or multiple transmission layers. In such cases, multiple layers are sent by TRP0 and TRP1, respectively. For example, DCI format 1_1 sent by TRP0 schedules 4 layers of data transmission, corresponding to 4 Demodulation Reference Signal (DMRS) ports, of which 2 layers can be from TRP0, and the other 2 layers can be from TRP1. At this time, the multiple data layers included in one PDSCH are divided into N groups, usually N=2, that is, a data layer group or a DMRS port group corresponding to one TRP. Basically, one data layer group corresponds to one DMRS port group wherein different DMRS port group may need separate QCL indication or transmission configuration indicators (TCI). In this scenario, the R15 solution supports multi-TRP transmission without major changes, because two cooperative TRPs can dynamically interact through the backhaul, and the control channel is transmitted by the primary serving base station.

However, the rate matching resource for a single point transmission in general is not suitable for multi-point transmission. Intuitively, the primary serving base station TRP0 can modify the RRC (Radio Resource Control) configuration to change previously configured rate matching resources to accommodate multi-point transmission. However, if dynamic switching of multi-point transmission and single point transmission is supported, the rate matching resource of the upper layer configuration can only be one of the corresponding multiple TRP and single TRP, because the high layer signaling changes slowly, and may not be able to keep up with a downlink control signaling mechanism, such as DCI, which changes at a faster rate.

One possible solution is to use the available DCI signaling values (e.g., TCI field or Transmission Configuration Indicator field). For example, implementations may divide the TCI configuration of the high-level configuration into M1 groups, and then configure the rate matching resources of the high-level configuration into M2 groups to establish the correspondence between the TCI configuration of the M1 groups and the rate matching resources of the M2 groups using a relationship. Here, M1 and M2 are integers and may in general be different from each other. The rate matching resource group (RMRG) is selected by using the TCI configuration group indicated by the TCI value in the DCI and the correspondence between them defined by a mapping. The UE only needs to perform rate matching on all or part of the rate matching resources in the selected RMRG and perform rate matching on the rate matching resources in the selected RMRG. The TCI configuration of the high-level configuration generally refers to the TCI configuration configured with RRC signaling or Medium Access Control (MAC) control element (CE). The rate matching resources configured by the upper layer generally are configured by using RRC signaling, and of course, the MAC CE configuration is not excluded.

Figure 3:
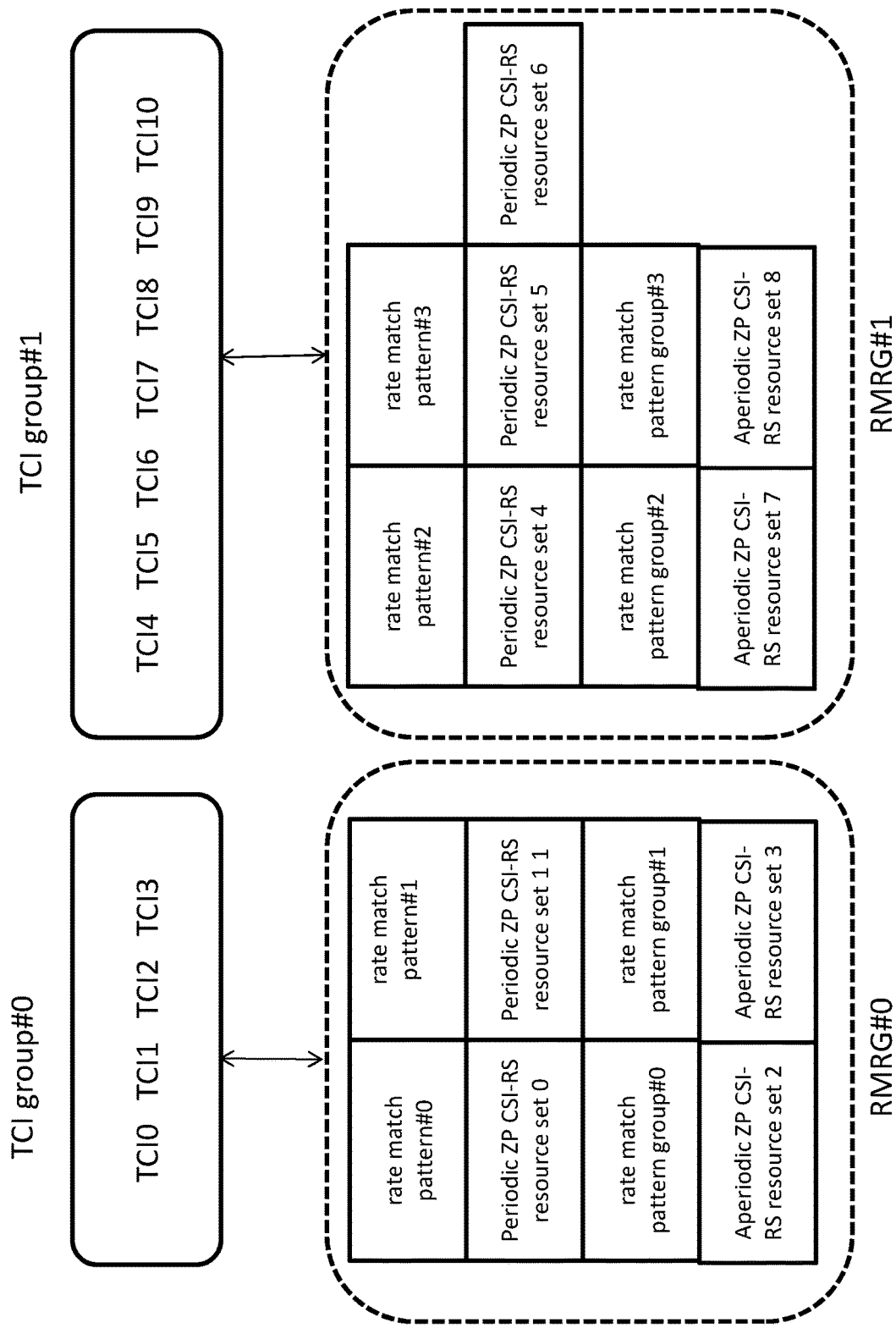
FIG. 3 shows an example of a transmission configuration indication (TCI) embodiment.

As shown in FIG. 3, the TCI configurations TCI0, TCI1, . . . TCI10 of the RRC signaling configuration are divided into two groups, namely TCI configuration group #0, #1. The rate matching resources configured by the RRC signaling may be divided into multiple groups (two, in this case), namely RMRG #0, #1, and has a corresponding relationship with TCI configuration group #0, #1, respectively.

Figure 4:
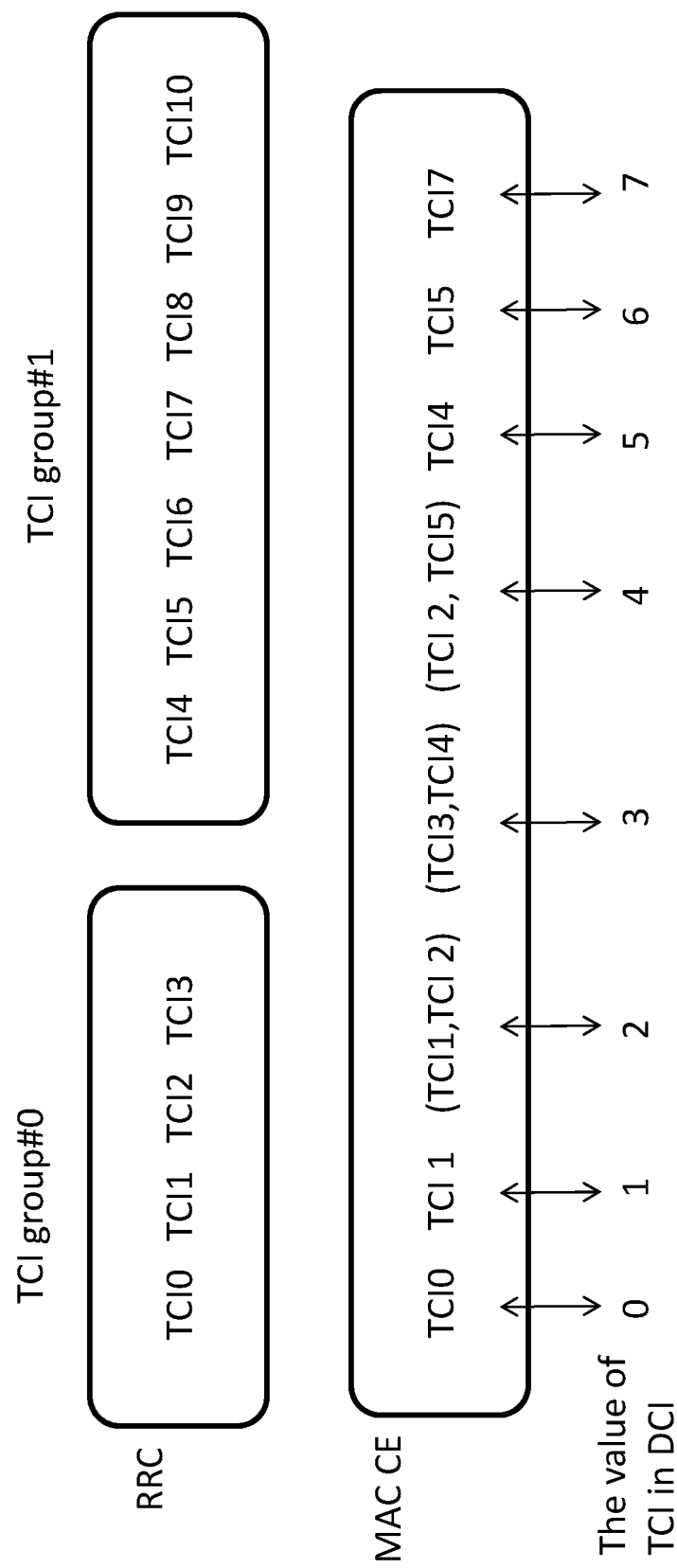
FIG. 4 shows an example of a TCI configuration process.

Since the TCI configuration can be further updated or selected at the MAC layer, for the convenience of discussion, this document refers to the TCI configuration of the RRC signaling configuration as the TCI RRC configuration or TCI state, and the configuration of the TCI output by the MAC CE is called the TCI MAC configuration. As shown in FIG. 4, the MAC CE can be used to select or combine from multiple TCI RRC configurations. The number of potential candidates for the TCI MAC configuration output by the MAC CE is typically fixed. In Release-15, 3 bits are used and thus this number is fixed to eight. For example, in Release-15, only a 3-bit TCI indication is available in the DCI. The value of the 3 bits DCI is 0-7 and the eight TCI MAC configurations output by the MAC CE are in one-to-one correspondence. A candidate TCI MAC configuration output by the MAC CE may include one TCI RRC configuration, or may include multiple TCI RRC configurations.

When the TCI configuration corresponding to the value of the TCI in the DCI belongs to only the TCI configuration group #0, the rate matching resource included in the RMRG #0 cannot be used for the PDSCH transmission of the DCI scheduling. Further, if the resource of the RMRG #0 is semi-static, it cannot be used for PDSCH transmission. If the rate matching resource included in the RMRG #0 needs to be dynamically triggered, such as the rate matching pattern group #0 and the rate matching pattern group #1 in the RMRG #0, the base station needs to utilize the Rate in the DCI. The matching indicator indicates whether one or two rate matching pattern groups in the UE RMRG #0 can be used for PDSCH transmission. If the dynamic rate matching pattern set is indicated not to be used for PDSCH, then it cannot be used for PDSCH, otherwise it can still be used for PDSCH transmission. For example, the aperiodic zero-power CSI-RS resource set 2 and set 3 in the RMRG #0, if the base station uses the ZP CSI-RS trigger in the DCI to indicate that set 2 cannot be used for PDSCH transmission, then on set 3 Resources can still be used for PDSCH transmission. However, the rate matching resources included in the RMRG #1 are available for PDSCH transmission. For example, if the TCI value in the DCI is equal to 0, then the corresponding TCI configuration is TCI0, and TCI0 corresponds to the RMRG #0, then the semi-static rate matching resource under the RMRG #0 cannot be used for the PDSCH transmission. The rate matching indicator in DCI is used to indicate the rate matching pattern group under RMRG #0.

The ZP CSI-RS trigger in the DCI may be used to indicate that a certain aperiodic zero-power CSI-RS resource set within the RMRG #0 is not used for PDSCH transmission. In this case, the resources of the remaining aperiodic ZP CSI-RS resource sets can still be used for PDSCH transmission. Taking 2 bits rate matching indicator as an example, 00 represents that both the first and the second rate matching pattern groups in RMRG #0 are available for PDSCH transmission; 01 represents that the first rate matching pattern groups in RMRG #0 is available but the second is not available; 10 represents that the first rate matching pattern groups in RMRG #0 is not available but the second is available; 11 represents that neither of the first and the second rate matching pattern groups in RMRG #0 are available for PDSCH transmission. In short, ZP CSI-RS trigger in DCI may be used to indicate that zero or one of aperiodic ZP CSI-RS resource set from the identified RMRG, wherein the identified RMRG is indicated by TCI value in DCI and the mapping between TCI groups and rate matching resource groups.

Basically, in one example embodiment, two TCI configurations correspond to two DMRS groups or two layer groups of one PDSCH, and the two layer groups can be transmitted from two TRPs or two panels of one TRPs. If the TCI value in DCI is equal to 2 which corresponds to TCI configuration 1 and 2, the corresponding RMRG is RMRG #0 since both TCI configuration 1 and 2 correspond to RMRG #0. In this case, it is a multi-panel transmission instead of multi-TRP transmission.

When the TCI configuration corresponding to the value of the TCI in the DCI belongs only to the TCI configuration group #1, the rate matching resource included in the RMRG #1 cannot be used for the PDSCH transmission of the DCI scheduling. Further, if the resource of the RMRG #1 is semi-static, it cannot be used for PDSCH transmission. If the rate matching resource included in the RMRG #1 needs to be dynamically triggered, such as the rate matching pattern group #2 and the rate matching pattern group #3 in the RMRG #1, the base station may utilize the rate matching indicator in the DCI. The matching indicator indicates whether the rate matching pattern group in the UE RMRG #1 is available for the PDSCH transmission. If the dynamic rate matching pattern set is indicated not to be used for PDSCH, then it cannot be used for PDSCH, otherwise it can still be used for PDSCH transmission. For example, the aperiodic zero-power CSI-RS resource set 7 and set 8 in the RMRG #1, if the base station uses the ZP CSI-RS trigger in the DCI to indicate that the resources occupied by the set 8 cannot be used for the PDSCH transmission, then the set The resources on 7 can still be used for PDSCH transmission. However, the rate matching resources included in the RMRG #0 are available for PDSCH transmission. For instance, if the value of TCI in DCI is 5 which corresponds to TCI configuration 4, then the semi-static rate matching resources in RMRG #1 cannot be used for the PDSCH transmission since TCI configuration 4 belongs to TCI configuration group #1 which corresponds to RMRG #1. Whether the rate matching pattern group(s) in the RMRG #1(RMRG #1) can be used for the PDSCH transmission or not depends on Rate matching indicator in DCI. Taking 2 bits rate matching indicator as an example, 00 represents that both the first and the second rate matching pattern groups in RMRG #1 are available for PDSCH transmission; 01 represents that the first rate matching pattern groups in RMRG #1 is available but the second is not available; 10 represents that the first rate matching pattern groups in RMRG #1 is not available but the second is available; 11 represents that neither of the first and the second rate matching pattern groups in RMRG #1 are available for PDSCH transmission. Likewise, ZP CSI-RS trigger in DCI is to indicate that zero or one of aperiodic ZP CSI-RS resource sets in RMRG #1 is not used for the PDSCH transmission.

In some embodiments, if the TCI value in DCI indicates one TCI configuration which corresponds to one RMRG, a rate matching indicator and/or a ZP CSI-RS trigger in DCI are used to select aperiodic rate matching resources within the corresponding RMRG.

When the value of the TCI in the DCI corresponds to multiple TCI configurations, some belong to the TCI configuration group #0, and some belong to the TCI configuration group #1, then both the RMRG #0 and the group #1 are used for PDSCH transmission scheduled by this DCI. Further, if the resources of the RMRG #0, #1 are semi-static, they are certainly not available for PDSCH transmission. The rate matching indicator and/or ZP CSI-RS trigger in DCI are used to select aperiodic rate matching resources within the both RMRGs. For instance, if the value of TCI in DCI is 3 which corresponds to TCI configuration 3 and 4 as shown in FIG. 4, then the semi-static rate matching resources in both RMRG #0 and #1 are not available for the PDSCH transmission since TCI configuration 3 and 4 belongs to TCI configuration group #0 and #1 respectively which correspond to both RMRGs. Whether the rate matching pattern group(s) in the two RMRGs can be used for the PDSCH transmission or not depends on the rate matching indicator in DCI. Taking 2 bits Rate matching indicator as an example, 00 represents that all rate matching groups in the two RMRGs are available for PDSCH transmission; 01 represents that the first rate matching pattern group in both RMRG #0 and #1 is available but the second in both RMRG #0 and #1 is not available; 10 represents that the first rate matching pattern group in both RMRG #0 and #1 is not available but the second in both RMRG #0 and #1 is available; 11 represents that all rate matching groups in the two RMRGs are not available for PDSCH transmission. Likewise, ZP CSI-RS trigger in DCI is to indicate that zero or one of aperiodic ZP CSI-RS resource sets from both RMRG #0 and RMRG #1 is not used for the PDSCH transmission, e.g. the value 01 of ZP CSI-RS trigger represents that the first ZP CSI-RS resource set in both RMRG #0 and RMRG #1 is not available for the PDSCH transmission.

Alternatively, in the case when TCI value in DCI corresponds to multiple TCI configurations, and some belong to TCI configuration group #0 and others belong to TCI configuration group #1, rate matching resources correspond to TCI configuration group #0 is not available for the layers of the PDSCH correspond to DMRS group #0 and rate matching resources correspond to TCI configuration group #1 is not available for the layers correspond to DMRS group #1 if the rate matching resources are semi-static. If the rate matching resources are aperiodic, rate matching indicator and/or ZP CSI-RS trigger in DCI are used to select aperiodic rate matching resources within the both RMRGs wherein the selected rate matching resources in RMRG #0 is not available for layer group #0 corresponding to DMRS group 0 and the selected rate matching resources in RMRG #1 is not available for layer group #1 corresponding to DMRS group 0. In this case, DMRS group 0 and 1 correspond to the first TCI configuration and the second TCI configuration respectively which are both indicated by TCI value in DCI.

For instance, if the value of TCI in DCI is 3 which corresponds to TCI configuration 3 and 4 as shown in FIG. 4, then the semi-static rate matching resources in RMRG #0 are not available for the layer group #0 of the PDSCH transmission and the semi-static rate matching resources in RMRG #1 are not available for the layer group #1 of the PDSCH transmission. As for aperiodic rate matching resources, taking 2 bits Rate matching indicator as an example, 00 represents that both the first and the second rate matching pattern groups in RMRG #1 are available for PDSCH transmission; 01 represents that the first rate matching pattern group in RMRG #0 and RMRG #1 is available for layer group #0 and layer group #1 respectively but the second rate matching pattern group in RMRG #0 and RMRG #1 is not available for layer group #0 and layer group #1 respectively; 10 represents that the first rate matching pattern group in RMRG #0 and RMRG #1 is not available for layer group #0 and layer group #1 respectively but the second rate matching pattern group in RMRG #0 and RMRG #1 is available for layer group #0 and layer group #1 respectively. The bit combination 11 represents that both the first and the second rate matching pattern groups in RMRG #0 and RMRG #1 are not available for layer group #0 and layer group #1 respectively. Generally, rate matching resources in RMRG #0 is only used for the layer group #0 transmission and rate matching resources in RMRG #1 is only used for the layer group #1 transmission. So the rate matching resources in RMRG #0 is still available for layer group #1 and the rate matching resources in RMRG #1 is still available for layer group #0. Certainly, it is possible that rate matching resources in RMRG #1 is only used for the layer group #0 transmission and rate matching resources in RMRG #0 is only used for the layer group #1 transmission.

In addition, $N_{oh}^{PRB}$ can also be as one kind of rate matching resource. Then $N_{oh}^{PBR}$ can be configured independently for different RMRG. The overhead calculation for TBS can also be different. This is reasonable since each TRP may have different overhead calculation method.

Example Embodiment 2

Figure 5:
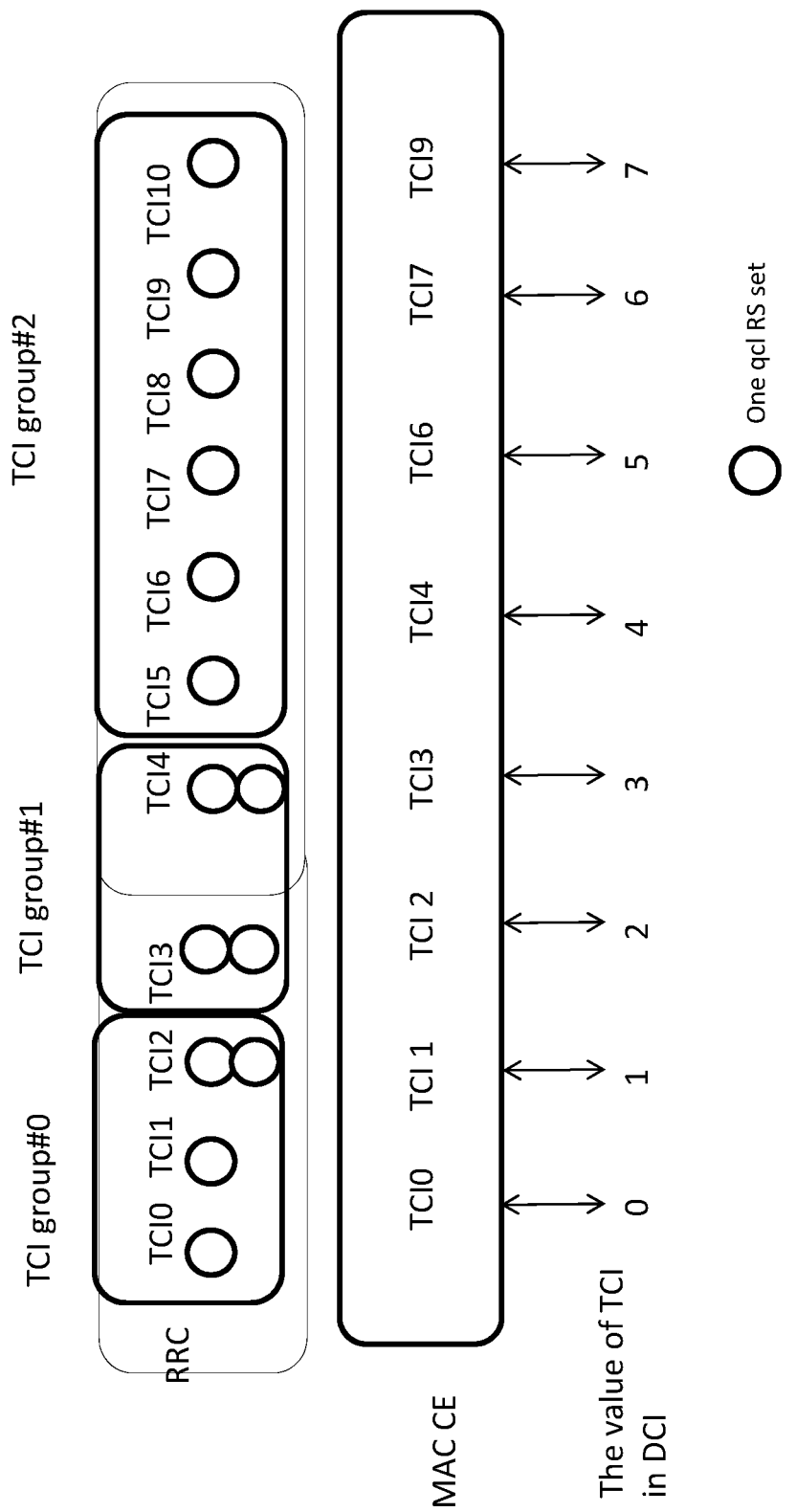
FIG. 5 shows an example of a TCI configuration that includes two Quasi Colocation (QCL) RS sets.

FIG. 4 is just one example of the procedure of TCI configuration. Another example is shown in FIG. 5, wherein one TCI RRC configuration can include one or multiple e.g. 2 QCL reference signal (RS) sets which represent by two circles in figure (e.g., TCI2, TCI3 and TCI4 are shown to have QCL RS sets). In this case, MAC CE is only used to select some TCI configurations from ones configured by RRC in order to save DCI overhead.

In Rel-15, only one QCL RS set is included in one TCI-State, i.e. TCI RRC configuration. If multi-TRP transmission are scheduled to one UE, two QCL RS sets can be included in one TCI state as follows. As same as Rel-15, one QCL RS set can still include one or two qcl-Type which represents one RS. So the first QCL RS set includes qcl-Type1 and qcl-Type2, the second QCL RS set includes qcl-Type3 and qcl-Type4.

TABLE 1

| TCI-State ::= | SEQUENCE { | |
|---|---|---|
| tci-StateId | TCI-StateId, | |
| qcl-Type1 | QCL-Info, | |
| qcl-Type2 | QCL-Info OPTIONAL, | -- Need R |
| qcl-Type3 | QCL-Info, OPTIONAL, | -- Need R |
| qcl-Type4 | QCL-Info OPTIONAL, | -- Need R |
| } | | |

Basically, two QCL RS sets correspond to two DMRS groups or two-layer groups of one PDSCH, and the two layer groups can be transmitted from two TRPs or two panels of one TRPs. In high frequency bands, e.g. above 6 GHz, one QCL RS set may mean one beam.

Since two TRPs usually have different rate matching resources, all rate matching resources configured by RRC signaling can still be divided into two groups, i.e. RMRG #0 and RMRG #1 which corresponds to two TRPs As shown in FIG. 5, all TCI configurations are divided into three TCI configuration groups or TCI groups, wherein TCI group #0, 1, 2 are associated with RMRG #0, (RMRG #0, RMRG #1) and RMRG #1 respectively.

In this example, if TCI value indicated by DCI is 0 or 1 or 2, the corresponding TCI groups are TCI group #0 which corresponds to RMRG #0, the rate matching resources in RMRG #0 will not be available for PDSCH transmission, especially if those rate matching resources are semi-static. If the rate matching resources in RMRG #0 is dynamic, some other DCI fields, e.g. Rate matching indicator or ZP CSI-RS trigger should be used to indicate UE whether those rate matching resources is available for PDSCH or not. In this case, it can be understood that the PDSCH is transmitted from TRP #0.

If TCI value indicated by DCI is 5 or 6 or 7, the corresponding TCI groups are TCI group #2 which corresponds to RMRG #1, the rate matching resources in RMRG #1 will not be available for PDSCH transmission, especially if those rate matching resources are semi-static. If the rate matching resources in RMRG #1 is dynamic, some other DCI fields, e.g. Rate matching indicator or ZP CSI-RS trigger should be used to indicate UE whether those rate matching resources is available for PDSCH or not. In this case, it can be understood that the PDSCH is transmitted from TRP #1.

If TCI value indicated by DCI is 3 or 4, the indicated TCI MAC configuration or TCI RRC configuration includes two QCL RS sets, and the corresponding TCI groups are TCI group #1 which correspond to both RMRG #0 and #1, one solution is that the rate matching resources in RMRG #0 will not be available for the layer group #0 of PDSCH transmission, and the rate matching resources in RMRG #1 will not be available for the layer group #1 of PDSCH transmission especially if those rate matching resources are semi-static. If the rate matching resources in RMRG #0 and RMRG #1 are dynamic, some other DCI fields, e.g. Rate matching indicator or ZP CSI-RS trigger should be used to indicate UE whether those aperiodic rate matching resources in RMRG #0 and RMRG #1 are available for layer group #0 and layer group #1 respectively. For instance, a "01" value of ZP CSI-RS trigger in DCI means the first ZP CSI-RS resource set in RMRG #0 and the first ZP CSI-RS resource set in RMRG #1 are not available for the layer group #0 and the layer group #1 respectively. In a short, the rate machining resources in RMRG #0 are only used for the layer group #0 of PDSCH and the rate machining resources in RMRG #1 are only used for the layer group #1 of PDSCH. Another solution is that the rate machining resources in both RMRG #0 and RMRG #1 are used for the whole PDSCH transmission. In this case, the semi-static rate machining resources, e.g. LTE CRS resource in both RMRG #0 and RMRG #1 are not available for the scheduled PDSCH transmission. If the rate matching resources in RMRG #0 and RMRG #1 are dynamic, some other DCI fields, e.g. Rate matching indicator or ZP CSI-RS trigger should be used to indicate UE whether those aperiodic rate matching resources in RMRG #0 and RMRG #1 are available for PDSCH. For instance, a 01 value of ZP CSI-RS trigger in DCI means the first ZP CSI-RS resource set in RMRG #0 and the first ZP CSI-RS resource set in RMRG #1 are not available for the PDSCH transmission.

Example Embodiment 3

Basically, above solutions are to divided TCI states or configurations into M1 groups, and divided rate matching resources into M2 groups. Then setting up the association between M1 groups of TCI states and M2 groups of rate matching resources.

One solution is to configure group ID under each TCI states as follows:

TABLE 2

| TCI-State ::= | SEQUENCE { | |
|---|---|---|
| tci-StateId | TCI-StateId, | |
| groupID | (0, 1, . . .} | |
| qcl-Type1 | QCL-Info, | |
| qcl-Type2 | QCL-Info OPTIONAL, | -- Need R |
| . . . | | |
| } | | |

The value range of group ID can be from 0 to M1-1. For instance, M1=3, then group ID=0 corresponds to RMRG #0, group ID=1 corresponds to RMRG #1, and group ID=2 corresponds to both RMRG #0 and RMRG #1 (are not available for the entire PDSCH or for layer group #0 and layer group #1 respectively). In a short, each group ID corresponds to one or more rate matching resource groups.

Optionally, this group ID directly is the TCI group ID. One TCI group can be thought as one TRP transmission. In high frequency bands, e.g. center frequency is above 6 GHz, different TRPs should be configured with different phase tracking reference signal (PTRS) ports since oscillators from different TRPs are separate. So straightforwardly, each TCI group ID can be associated with one PTRS port.

In a special case, M1 can be equal to M2. Then group ID can directly represent the RMRG ID as shown in FIG. 3 and FIG. 4 since it is one to one mapping between the TCI group and RMRG.

Since current R15 only supports one group of rate matching resource which is for single TRP transmission, some or all of rate matching resources can be extended to two. As shown in following structure of RRC configuration, the bold parameters including lte-CRS-ToMatchAround2, rateMatchPatternToAddModList2 and rateMatchPattern-ToReleaseList2 are newly added and belong to the RMRG #1, the legacy ones belong to RMRG #0.

TABLE 3

| ServingCellConfigCommon ::= | SEQUENCE { |
|---|---|
| ... | |
| lte-CRS-ToMatchAround | SetupRelease |
| { RateMatchPatternLTE-CRS } | |
| rateMatchPatternToAddModList SEQUENCE (SIZE | |
| (1. .maxNrofRateMatchPatterns) ) OF RateMatchPattern | |
| rateMatchPatternToReleaseList | SEQUENCE (SIZE |
| (1. .maxNrofRateMatchPatterns) ) OF RateMatchPatternId | |
| lte-CRS-ToMatchAround2 | SetupRelease |
| { RateMatchPatternLTE-CRS } | |
| rateMatchPatternToAddModList2 SEQUENCE (SIZE | |
| (1. .maxNrofRateMatchPatterns) ) OF RateMatchPattern | |
| rateMatchPatternToReleaseList2 | SEQUENCE (SIZE |
| (1. .maxNrofRateMatchPatterns) ) OF RateMatchPatternId | |
| ... | |
| } | |

Likewise, the bold parameters under PDSCH-Config are also newly added and belong to RMRG #1, and others belong to RMRG #0.

TABLE 4

| PDSCH-Config ::= | SEQUENCE { |
|---|---|
| ... | |
| rateMatchPatternToAddModList | |
| rateMatchPatternToReleaseList | |
| rateMatchPatternGroup1 | |
| rateMatchPatternGroup2 | |
| rateMatchPatternToAddModList2 | |
| rateMatchPatternToReleaseList2 | |
| rateMatchPatternGroup12 | |
| rateMatchPatternGroup22 | |
| } | |

Taken as a whole, each TCI group is associated with one or more RMRGs, and TCIs within the same TCI group are associated with the same RMRGs. If multiple TCIs are configured with the same group ID, they are associated with the same RMRGs.

For semi-static PDSCH transmission, there may be only MAC CE to schedule PDSCH transmission instead of DCI scheduling. In this case, there is nothing related with aperiodic rate matching resources. After setting up the relationship between M1 TCI groups and M2 RMRGs, MAC CE is to finally select TCI states or TCI value or TCI configuration. Based on the mapping, the identified RMRG(s) can be determined by this MAC CE.

Example Embodiment 4

During initial Rel-16 discussion, DMRS sequence was agreed to be enhanced for reducing PAPR (peak to average power ratio). For cyclic prefix OFDM (CP-OFDM) and for both DMRS type 1 and 2, the following $c_{init}$ for code division multiplexing (CDM) group $\lambda$ is used for Rel-16 DMRS sequence generation:

$$c_{init}(\lambda) = \left(2^{17}(N_{symb}^{slot}n_{s,f}^{\mu} + l + 1)\left(2N_{ID}^{n'_{SCID}(\lambda)} + 1\right) + 2N_{ID}^{n'_{SCID}(\lambda)} + n'_{SCID}(\lambda) + 2^{17}\left\lfloor\frac{\lambda}{2}\right\rfloor\right) \mod 2^{31}$$

Where
$n'_{SCID}(\lambda=0) = n_{SCID}$
$n'_{SCID}(\lambda=1) = 1 - n_{SCID}$
$n_{SCID}(\lambda=2) = n_{SCID}$
and where $n_{SCID}$ is provided by DCI, $\lambda$ is absolute CDM group index, $c_{init}$ is sequence initialization, $N_{symb}^{slot}$ is the number symbols per slot, $\mu_{s,f}$ is the slot number in a subcarrier spacing configuration, l is the symbol number, $n_{SCID}$ is indicated by DCI, $N_{ID}^0$ and $N_{ID}^1$ are higher layer configured variables.

Basically, in the second and the third CDM group, DMRS sequence is not same as Rel-15. As shown in FIG. 2, if TRP1 is Rel-15 base station and TRP 0 is Rel-16 base station, TRP1 cannot use Rel-16 sequence in the second and the third CDM groups if the UE is scheduled with four or more layers. If whether the new sequence or legacy Rel-15 sequence depends on RRC signaling, multi-TRP or dynamical point selection transmission cannot be supported since the coordinated TRP 1 can only use the legacy sequence but TRP0 can use new sequence for low PAPR. In order to solve the problem without increasing of DCI overhead, DMRS sequence configuration can be associated with each TCI state or TCI group. In other words, DMRS sequence configuration is per TCI state or TCI group. After getting TCI value indicated by DCI, the DMRS sequence configuration will be known at UE side. Specifically, DMRS sequence configuration is whether the new sequence or legacy one is used. Taking FIG. 3 as an example, 1 bit DMRS sequence indication is configured per TCI group. If the indicated TCI value corresponds to TCI group #0, whether the new DMRS sequence or legacy sequence depends on 1 bit DMRS sequence indication which is associated TCI group #0.

Example Embodiment 5

In above solutions, the TCI value in DCI is to indicate both TCI configuration and the corresponding RMRG. Optionally, ZP CSI-RS trigger or Rate matching indicator in DCI can be used to select the corresponding RMRG.

For instance, ZP CSI-RS trigger in DCI can be used for both legacy functionality and selection of RMRG. The legacy functionality is to select aperiodic ZP CSI-RS resource set from multiple configured ones. For example, 2 bits ZP CSI-RS trigger value 00 and 01 means RMRG #0, 10 and 11 means RMRG #1.

The rate matching indicator in DCI may also be used similarly.

Some embodiments may divide the TCI configuration of the high-level configuration into M1 groups, and then configure the rate matching resources of the high-level configuration into M2 groups to establish the correspondence between the TCI configuration of the M1 groups and the rate matching resources of the M2 groups. The RMRG is selected by using the TCI configuration group indicated by the TCI value in the DCI and the correspondence. The UE only needs to perform rate matching on all or part of the rate matching resources in the selected RMRG, and rate matching the rate matching resources in the selected RMRG.

Figure 6:
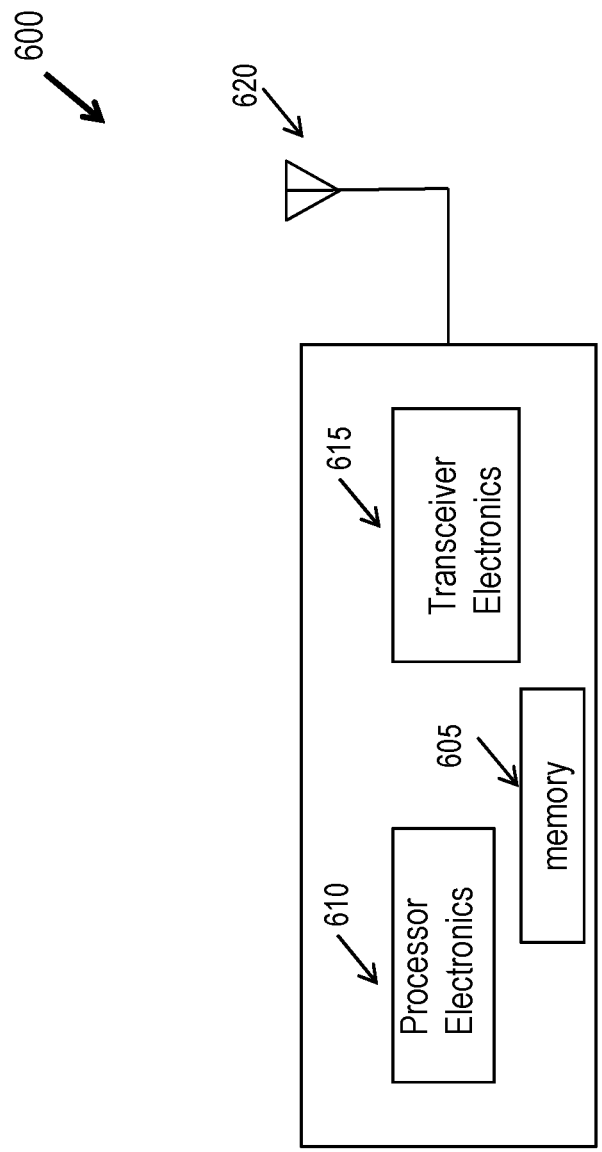
FIG. 6 is a block diagram showing an example embodiment of a wireless communication device.

FIG. 6 depicts a block diagram representing of a portion of a radio station 605. A radio station 605 such as a base station or a wireless device can include processor electronics 610 such as a microprocessor that implements one or more of the wireless techniques presented in this document. The radio station 605 can include transceiver electronics 615 to send and/or receive wireless signals over one or more communication interfaces such as antenna 620. The radio station 605 can include other communication interfaces for transmitting and receiving data. Radio station 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the radio station 605.

Figures 7, 8:
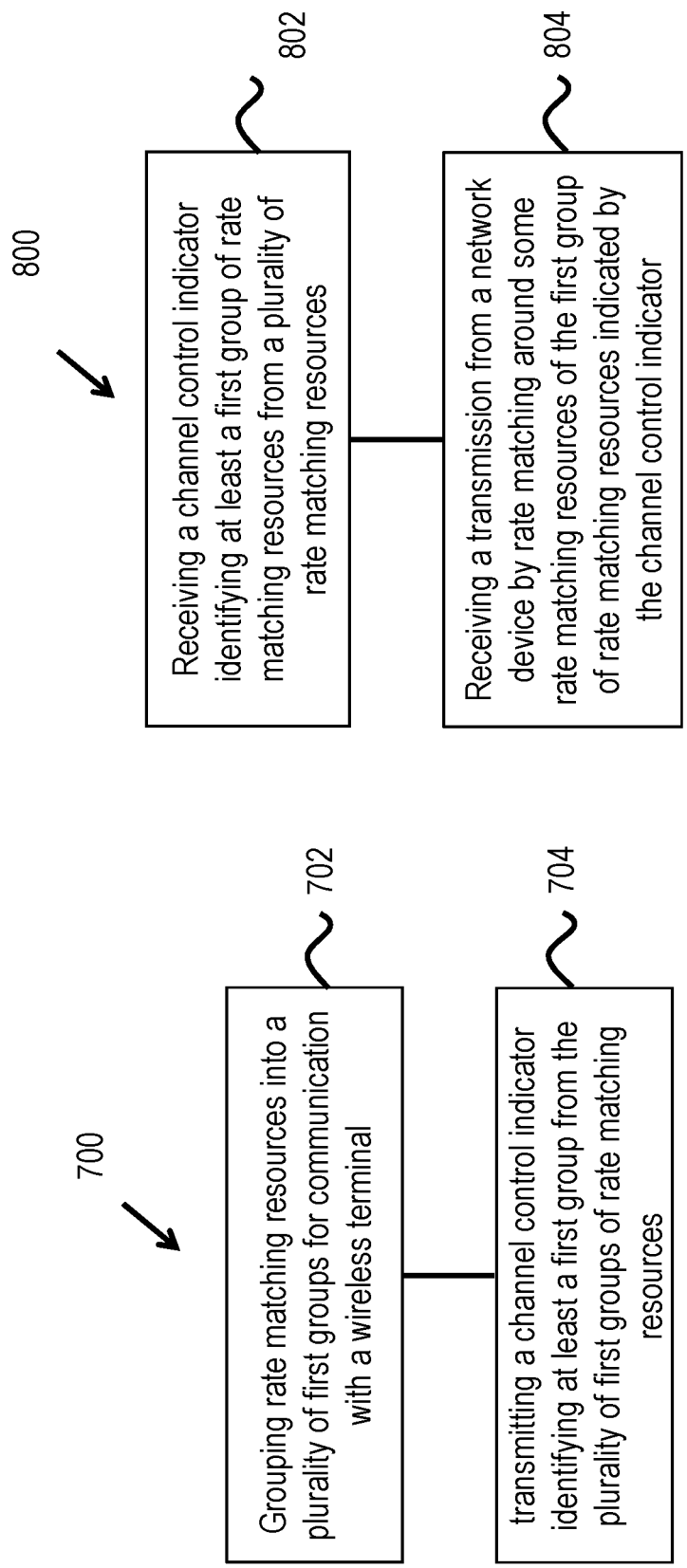
FIG. 7 shows a flowchart for an example method of wireless communication.
FIG. 8 shows a flowchart for another example method of wireless communication.

FIG. 7 is a flowchart representation of a method 700 of wireless communication. The method 700 includes grouping (702), by a network device, rate matching resources into a plurality of first groups for communication with a wireless terminal and transmitting (704) a channel control indicator identifying at least a first group from the plurality of first groups of rate matching resources.

FIG. 8 is a flowchart for a method 800 of wireless communications. The method 800 includes receiving (802), at a wireless terminal, a channel control indicator identifying at least a first group of rate matching resources from a plurality of rate matching resources and receiving (804) a transmission from a network device by rate matching around some rate matching resources of the first group of rate matching resources indicated by the channel control indicator.

FIG. 9 is a flowchart for a method 900 of wireless communications. The method 900 includes receiving (902), by a wireless terminal, a medium access control (MAC) layer control element indicative of one or more transmission configuration states to be used by the wireless terminal, determining (904), using a mapping, a rate matching resource group from a plurality of rate matching resource groups corresponding to the one or more transmission configuration states and performing (906) rate matching around rate matching resources corresponding to the one or more transmission configuration states indicated by the MAC control element.

FIG. 10 is a flowchart for a method 1000 of wireless communications. The method 1000 includes transmitting (1002), by a network device, a MAC layer control element indicative of one or more transmission configuration states to be used by a wireless terminal, wherein a mapping defines a correspondence between a rate matching resource from a plurality of rate matching resource groups, wherein the rate matching resources are rate matched around for shared data channel transmissions from the network device to the wireless terminal, and communicating (1004) the mapping to the wireless terminal in a radio resource link layer message.

With reference to methods 700, 800, 900 and 1000, additional features are described with reference to FIGS. 1 to 5 and may include the following.

In some embodiments, the channel control indicator may be included in DCI and includes one or more of: a transmission configuration indicator (TCI) value; a zero-power channel state information reference signal (ZP CSI-RS) trigger; or a rate matching indicator.

In some embodiments, each rate matching resource includes one or more of: a rate matching pattern comprising multiple time-frequency transmission resources, a periodic zero power channel state information reference signal (ZP CSI-RS) resource set, an aperiodic ZP CSI-RS resource set, a semi-persistent ZP CSI-RS resource set, a long-term evolution cell-specific reference signal (LTE CRS) resource, or a rate matching pattern group.

In some embodiments, the following additional steps may be performed: grouping TCI states into a plurality of second groups, and associating, using a mapping, the plurality of first groups with the plurality of second groups. In some embodiments, second group corresponds to one or more first groups.

In some embodiments, the channel control indicator identifies one or more first groups associated with one or more second groups indicated by the channel control indicator. In some embodiments, a first group ID or a second group ID is configured under each TCI state. In some embodiments, in case that more than one first group are identified, each identified first group is identified for each layer group of a data transmission. In some cases, when that more than one first group is identified, all identified first groups are identified for all layer groups of a data transmission.

In some embodiments, some aperiodic ZP CSI-RS resource set(s) are selected by a ZP CSI-RS trigger from the identified first group(s).

In some embodiments, the following one or more of the following rate matching resources are unavailable for the corresponding layer group(s) of the data transmission: selected aperiodic ZP CSI-RS resource set(s) indicated by the channel control indicator, selected rate matching pattern group(s) indicated by the channel control indicator, or other non-aperiodic rate matching resources within the identified first group(s).

In some embodiments, wherein a first group ID or a second group ID configured under each TCI state is associated with a phase tracking reference signal (PTRS) port. In some embodiments, at least some rate matching resources in at least one of the first groups correspond to a quasi-co-located reference signal set.

In some embodiments, the wireless terminal receives the mapping from a radio resource layer message from a network device. In some embodiments, at least one of the multiple rate matching configurations corresponds to a quasi-co-located reference signal set. In some embodiments, the plurality of rate matching groups corresponds to a plurality of transmission reception points (TRPs).

In various embodiments, the mobile terminal may be a smartphone, a tablet, a smartwatch, and IoT device or another hardware platform (e.g, FIG. 6) capable of transmitting and receiving wireless signals. The network device may be implemented in a base station functionality such as an eNodeB or a gNB.

It will be appreciated that techniques for signaling a mapping between rate matching resources in situations where multiple TRPs are used in a wireless network are disclosed.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of wireless communication, comprising:
   grouping, by a network device, rate matching resources into a plurality of first groups for communication with a wireless terminal, and
   transmitting a channel control indicator identifying at least a first group from the plurality of first groups of rate matching resources,
   wherein at least some rate matching resources in at least one of the plurality of first groups correspond to a quasi-co-located (QCL) reference signal set, and
   wherein TCI states are grouped in a plurality of second groups and a mapping associates the plurality of first groups with the plurality of second groups and identified rate matching groups are determined based on the mapping, and wherein each second group corresponds to one or more first groups.

2. The method of claim 1, wherein the channel control indicator includes one or more of:
   a transmission configuration indicator (TCI) value;
   a zero-power channel state information reference signal (ZP CSI-RS) trigger; or
   a rate matching indicator.

3. The method of claim 1, wherein each rate matching resource includes one or more of:
   a rate matching pattern comprising multiple time-frequency transmission resources,
   a periodic zero power channel state information reference signal (ZP CSI-RS) resource set,
   an aperiodic ZP CSI-RS resource set,
   a semi-persistent ZP CSI-RS resource set,
   a long-term evolution cell specific reference signal (LTE CRS) resource, or
   a rate matching pattern group.

4. The method of claim 1, wherein one or more of following rate matching resources are unavailable for a corresponding layer group(s) of a data transmission:
   selected aperiodic ZP CSI-RS resource set(s) indicated by the channel control indicator,
   selected rate matching pattern group(s) indicated by the channel control indicator, or
   other non-aperiodic rate matching resources within identified first group(s).

5. A method of wireless communication, comprising:
   grouping, by a network device, rate matching resources into a plurality of first groups for communication with a wireless terminal, and
   transmitting a channel control indicator identifying at least a first group from the plurality of first groups of rate matching resources, wherein at least some rate matching resources in at least one of the plurality of first groups correspond to a quasi-co-located (QCL) reference signal set, and wherein the method further comprises:

grouping TCI states into a plurality of second groups; and associating, using a mapping, the plurality of first groups with the plurality of second groups.

6. The method of claim 5, wherein each second group corresponds to one or more first groups.

7. The method of claim 6, wherein the channel control indicator identifies one or more first groups associated with one or more second groups indicated by the channel control indicator.

8. The method of claim 7, wherein in case that more than one first group are identified, each identified first group is identified for each layer group of a data transmission.

9. The method of claim 6, wherein (a) in case that more than one first group is identified, all identified first groups are identified for all layer groups of a data transmission, or (b) some aperiodic ZP CSI-RS resource set(s) are selected by a ZP CSI-RS trigger from identified first group(s), or (c) some rate matching pattern groups are selected by a rate matching indicator from the identified first groups, or (d) a first group ID or a second group ID configured under each TCI state is associated with a phase tracking reference signal (PTRS) port.

10. A method of wireless communication, comprising:

receiving, at a wireless terminal, a channel control indicator identifying at least a first group of rate matching resources from a plurality of first groups of rate matching resources; and receiving a transmission from a network device by the rate matching around some rate matching resources of the first group of rate matching resources indicated by the channel control indicator, wherein at least some rate matching resources in at least the first group correspond to a quasi-co-located (QCL) reference signal set, wherein TCI states are grouped in a plurality of second groups and a mapping associates the plurality of first groups with the plurality of second groups and identified rate matching groups are determined based on the mapping, and wherein each second group corresponds to one or more first groups.

11. The method of claim 10, wherein the channel control indicator includes one or more of:

a transmission configuration indicator (TCI) value;

a zero-power channel state information reference signal (ZP CSI-RS) trigger; or a rate matching indicator.

12. The method of claim 10, wherein each rate matching resource includes one or more of:

a rate matching pattern comprising multiple time-frequency transmission resources, a periodic zero power channel state information reference signal (ZP CSI-RS) resource set, an aperiodic ZP CSI-RS resource set, a semi-persistent ZP CSI-RS resource set, a long-term evolution cell specific reference signal (LTE CRS) resource, or a rate matching pattern group.

13. A wireless communication method, comprising:

receiving, by a wireless terminal, a medium access control (MAC) layer control element indicative of one or more transmission configuration states to be used by the wireless terminal;

determining, using a mapping, a rate matching resource group from a plurality of rate matching groups corresponding to the one or more transmission configuration states; and performing rate matching around rate matching resources corresponding to the one or more transmission configuration states indicated by the MAC layer control element.

14. The method of claim 13, wherein the wireless terminal receives the mapping from a radio resource layer message from a network device.

15. The method of claim 13, wherein at least one rate matching resource group includes multiple rate matching configurations, and wherein at least one of the multiple rate matching configurations corresponds to a quasi-co-located reference signal set.

16. The method of claim 13, wherein the plurality of rate matching groups corresponds to a plurality of transmission reception points (TRPs).

17. A method of wireless communication, comprising:

transmitting, by a network device, a medium access control (MAC) layer control element indicative of one or more transmission configuration states to be used by a wireless terminal, wherein a mapping defines a correspondence between a rate matching resource from a plurality of rate matching resource groups, wherein the rate matching resources are rate matched around for shared data channel transmissions from the network device to the wireless terminal, and communicating the mapping to the wireless terminal.

18. The method of claim 17, wherein the MAC control element includes one or more of:

a transmission configuration indicator (TCI) value;

a zero-power channel state information reference signal (ZP CSI-RS) trigger; or a rate matching indicator.

19. The method of claim 17, wherein each rate matching resource includes one or more of:

a rate matching pattern comprising multiple time-frequency transmission resources, a periodic zero power channel state information reference signal (ZP CSI-RS) resource set, an aperiodic ZP CSI-RS resource set, a semi-persistent ZP CSI-RS resource set, a long-term evolution cell specific reference signal (LTE CRS) resource, or a rate matching pattern group.

* * * * *